United States Patent
Chhabra

(10) Patent No.: US 10,458,405 B2
(45) Date of Patent: Oct. 29, 2019

(54) SYSTEMS AND METHODS UTILIZING A GROOVELESS FLUID END FOR HIGH PRESSURE PUMPING

(71) Applicant: Shivrat Chhabra, Houston, TX (US)

(72) Inventor: Shivrat Chhabra, Houston, TX (US)

(73) Assignee: Strom, Inc., Houston, TX (US)

( * ) Notice: Subject to any disclaimer, the term of this patent is extended or adjusted under 35 U.S.C. 154(b) by 359 days.

(21) Appl. No.: 15/432,665

(22) Filed: Feb. 14, 2017

(65) Prior Publication Data

US 2017/0152851 A1   Jun. 1, 2017

Related U.S. Application Data

(63) Continuation of application No. 14/736,312, filed on Jun. 11, 2015, now Pat. No. 9,605,767.

(60) Provisional application No. 62/011,009, filed on Jun. 11, 2014.

(51) Int. Cl.

| | |
|---|---|
| *F04B 53/10* | (2006.01) |
| *F16K 1/36* | (2006.01) |
| *F16K 27/02* | (2006.01) |
| *F04B 15/02* | (2006.01) |
| *B23P 19/00* | (2006.01) |

(52) U.S. Cl.
CPC .......... *F04B 53/1032* (2013.01); *B23P 19/00* (2013.01); *F04B 15/02* (2013.01); *F16K 1/36* (2013.01); *F16K 27/02* (2013.01); *Y10T 137/6065* (2015.04); *Y10T 137/7929* (2015.04)

(58) Field of Classification Search
CPC ........ F04B 15/02; F04B 53/1032; F16K 1/36; F16K 27/02; B23P 19/00; Y10T 137/6065; Y10T 137/7929

USPC ......................................................... 137/902
See application file for complete search history.

(56) References Cited

U.S. PATENT DOCUMENTS

| | | | | |
|---|---|---|---|---|
| 2,933,356 A | * | 4/1960 | Cunningham | F16J 13/10 220/378 |
| 3,277,837 A | * | 10/1966 | Pangburn | F04B 53/1022 220/203.23 |
| 3,542,057 A | * | 11/1970 | Staiano | E03F 5/042 137/328 |
| 4,140,240 A | * | 2/1979 | Platts | F16J 13/10 138/89 |
| 4,249,566 A | * | 2/1981 | Deane | F16K 17/24 137/498 |
| 4,516,477 A | * | 5/1985 | Lewis | F04B 53/00 417/454 |
| 4,634,353 A | * | 1/1987 | Huperz | F04B 37/12 417/564 |
| 4,817,671 A | * | 4/1989 | Mathison | F16L 55/132 138/89 |
| 4,861,241 A | * | 8/1989 | Gamboa | F04B 53/1027 417/454 |

(Continued)

*Primary Examiner* — Marina A Tietjen
*Assistant Examiner* — Frederick D Soski
(74) *Attorney, Agent, or Firm* — Pierson IP, PLLC

(57) ABSTRACT

Embodiments disclosed herein describe systems and methods for a spring retainer configuration without suction bore grooves, wherein the spring retainer may be secured in place via a keeper. By eliminating the grooves, embodiments may reduce the surface area of the bore intersection, which may slow the rate of material erosion. Accordingly, embodiments may extend the life of a fluid end in high pressure environments.

18 Claims, 5 Drawing Sheets

(56) References Cited

U.S. PATENT DOCUMENTS

| | | | | |
|---|---|---|---|---|
| 5,073,096 A * | 12/1991 | King | ............... | F04B 53/007 137/516.29 |
| 5,516,077 A * | 5/1996 | Roberts | ............... | F16K 27/02 251/148 |
| 6,382,940 B1 * | 5/2002 | Blume | ............... | F04B 53/007 277/435 |
| 6,544,012 B1 * | 4/2003 | Blume | ............... | F04B 53/007 277/370 |
| 6,623,259 B1 * | 9/2003 | Blume | ............... | F04B 53/007 137/543.23 |
| 6,843,108 B1 * | 1/2005 | Hunt | ............... | G01M 3/022 138/89 |
| 6,910,871 B1 * | 6/2005 | Blume | ............... | F04B 53/007 137/512 |
| 7,335,002 B2 * | 2/2008 | Vicars | ............... | F04B 53/007 137/512 |
| 7,364,412 B2 * | 4/2008 | Kugelev | ............... | F04B 53/007 417/454 |
| 7,506,574 B2 * | 3/2009 | Jensen | ............... | F04B 53/007 417/454 |
| 7,513,759 B1 * | 4/2009 | Blume | ............... | F04B 53/007 137/512 |
| 7,681,589 B2 * | 3/2010 | Schwegman | ............... | F16K 15/063 137/15.17 |
| 7,896,187 B2 * | 3/2011 | Haibel | ............... | F16J 13/08 220/233 |
| 8,147,227 B1 * | 4/2012 | Blume | ............... | F04B 53/007 137/512 |
| 8,251,243 B2 * | 8/2012 | Haibel | ............... | B65D 90/10 220/213 |
| 8,402,880 B2 * | 3/2013 | Patel | ............... | F04B 53/16 411/120 |
| 8,430,260 B2 * | 4/2013 | Guidry, Jr. | ............... | B01J 3/03 220/212 |
| 8,662,864 B2 * | 3/2014 | Bayyouk | ............... | F04B 1/0456 417/269 |
| 8,784,081 B1 * | 7/2014 | Blume | ............... | F04B 53/16 417/559 |
| 8,915,722 B1 * | 12/2014 | Blume | ............... | F04B 53/007 137/543.23 |
| 9,297,196 B2 * | 3/2016 | Yang | ............... | F16J 13/22 |
| 9,435,454 B2 * | 9/2016 | Blume | ............... | F16K 1/42 |
| 9,500,195 B2 * | 11/2016 | Blume | ............... | F04B 53/10 |
| 2007/0023096 A1 * | 2/2007 | Buckley | ............... | F16L 55/1283 138/89 |
| 2010/0158727 A1 * | 6/2010 | Hawes | ............... | F04B 39/121 417/521 |
| 2010/0175770 A1 * | 7/2010 | Huynh | ............... | F16L 37/088 138/89 |
| 2011/0030132 A1 * | 2/2011 | Biro | ............... | E03C 1/298 4/256.1 |
| 2011/0030213 A1 * | 2/2011 | Hawes | ............... | F04B 1/0404 29/888.02 |
| 2011/0308967 A1 * | 12/2011 | Byrne | ............... | C23F 13/06 205/730 |
| 2012/0063936 A1 * | 3/2012 | Baxter | ............... | E21B 43/25 417/415 |
| 2012/0141308 A1 * | 6/2012 | Saini | ............... | C08G 18/10 417/452 |
| 2012/0288387 A1 * | 11/2012 | Freed | ............... | F04B 53/10 417/454 |
| 2013/0020521 A1 * | 1/2013 | Byrne | ............... | F16K 1/385 251/334 |
| 2013/0202457 A1 * | 8/2013 | Bayyouk | ............... | B23P 6/00 417/279 |
| 2013/0202458 A1 * | 8/2013 | Byrne | ............... | F04B 7/02 417/279 |

\* cited by examiner

SYSTEMS AND METHODS UTILIZING A GROOVELESS FLUID END FOR HIGH PRESSURE PUMPING

CROSS-REFERENCE TO RELATED APPLICATIONS

This application claims a benefit of priority under 35 U.S.C. § 119 to Provisional Application No. 62/011,009 filed on Jun. 11, 2014 which is fully incorporated herein by reference in its entirety.

BACKGROUND INFORMATION

Field of the Disclosure

Examples of the present disclosure are related to systems and methods associated with a grooveless fluid end for high pressure pumping. More particularly, embodiments relate to a keeper that is coupled with a stem of a spring retainer and positioned adjacent to a face of a cylinder head, wherein the keeper is configured to allow visual verification of the spring retainer alignment within the suction bore prior to positioning the cylinder head.

Background

Conventionally, high pressure pumps are designed with two main sub-assemblies, a power end and a fluid end. The power end drives reciprocating motion of plungers, and the fluid end directs the flow of fluid from the pump. In use, the fluid ends are subject to rapid wear because of harsh conditions involved in the pumping process, including high temperatures, high pressures, corrosion, and abrasion from drilling fluids. Due to this rapid wear, conventional pumps require fluids ends to be replaced frequently.

Legacy fluid ends in high pressure pumps have wing style valve stop configurations. In wing style valve stops, projections on the valve stops are inserted into grooves in a suction bore. However, these grooves require material to be removed from the bore intersections, the highest stress areas in the fluid end. Since they increase the surface area of the intersecting bore area, and circumferential stress increases with surface area, these grooves often serve as initiation points for stress cracks. Furthermore, the grooves are subject to erosion, which results in a further loss of material from the high stress areas. As erosion occurs, the valve stop may no longer be locked in place, because the fit of the grooves become wider and less exact.

Accordingly, needs exist for more effective and efficient systems and methods for a spring retainer configuration without suction bore grooves, wherein the spring retainer may be aligned and held in place via a keeper.

SUMMARY

Embodiments disclosed herein describe systems and methods for a spring retainer configuration without suction bore grooves, wherein the spring retainer may be secured in place via a keeper. By eliminating the grooves, embodiments may reduce or maintain the surface area of the bore intersection, which may slow the rate of material erosion. Accordingly, embodiments may extend the life of a fluid end in high pressure environments.

In embodiments, a spring retainer may be positioned under a ridge at the top of a suction bore, wherein the ridges may be projections that decrease the circumference of the top surface of the suction bore. The ridges may be configured to decrease the surface area that is susceptible to erosion in comparison to conventional wing style designs, thereby reducing the rate and extent of washout caused to the fluid end. Accordingly, a lower circumference of the suction bore may be greater than a circumference of the portion of the suction bore that includes the ridges. The suction valve retainer or spring retainer is composed of a vertical portion (referred to collectively and individually as "stem") and a horizontal portion (referred to collectively and individually as "valve stop". The stem may be configured to aid in alignment stem, and the valve stop may be configured to retain the spring and suction valve.

Additionally, the ridges allow for a maximum amount of material to be positioned at the bore intersection. This may bolster the strength of the bore intersection, which may slow the rate of formation of stress cracks.

Embodiments may also include a keeper. The keeper may be configured to secure the spring retainer in place and maintain alignment during pump operation. The keeper may be an independent piece from the cylinder head and the spring retainer, wherein the keeper may be configured to ensure alignment with the spring retainer before a bore is closed via the cylinder head. Based on the geometry of the keeper, the keeper may be configured to be positioned adjacent to a solid face of the cylinder head and the stem when a face of the cylinder head is parallel with the stem. Responsive to positioning the keeper adjacent to a face of the cylinder head and inserting the keeper into the stem, the correct positioning of the valve stem may be verified, additionally, when the keeper is coupled with the cylinder head and stem, the spring retainer may not be able to be rotated.

In embodiments, the keeper may be a removable element, which may be removed and positioned adjacent to the the cylinder head and removed and inserted into the stem. Accordingly, the alignment of the keeper in relation to the spring retainer may be completed before sealing the fluid end with the cylinder head, allowing for visual verification.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
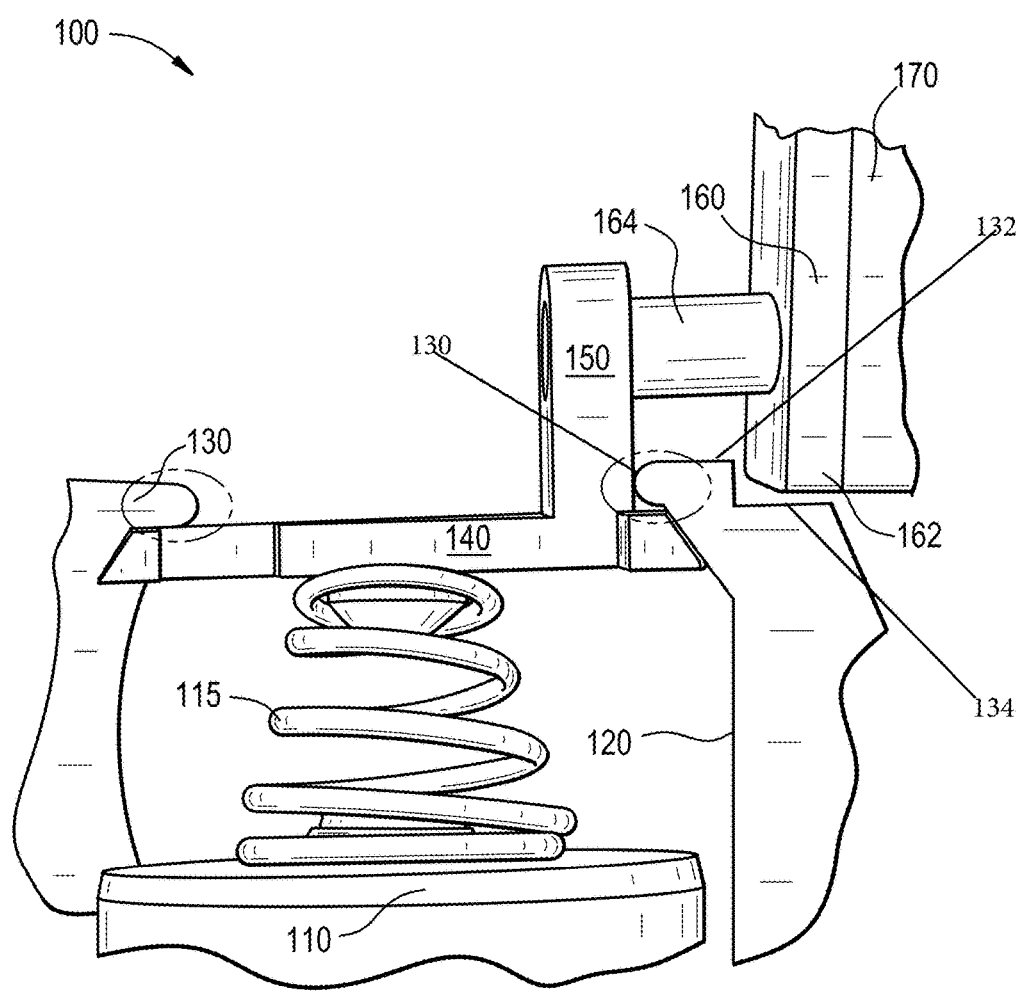
FIG. 1 depicts a cross section of the suction bore of a grooveless fluid end for high pressure pumping, according to an embodiment.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION

In the following description, numerous specific details are set forth in order to provide a thorough understanding of the present embodiments. It will be apparent, however, to one having ordinary skill in the art that the specific detail need not be employed to practice the present embodiments. In other instances, well-known materials or methods have not been described in detail in order to avoid obscuring the present embodiments.

Embodiments disclosed herein describe systems and methods for a spring retainer configuration without suction bore grooves, wherein the spring retainer may be secured in place via a keeper and ridges present in a suction bore of a grooveless fluid end. By eliminating the grooves, embodiments may reduce the surface area of a bore intersection, which may slow the rate of material erosion. Accordingly, embodiments may extend the life of a spring retainer in high pressure environments.

FIG. 1 depicts a cross section of a suction bore of a grooveless fluid end 100 for high pressure pumping, according to an embodiment. Grooveless fluid end 100 may be configured to be utilized in hydraulic fracturing applications, and have the ruggedness required for continuous operation in the harshest environments. Grooveless fluid end 100 may include a valve 110, spring 115, a suction bore 120, ridges 130, spring retainer 140, stem 150, keeper 160, and cylinder head 170.

Valve 110 may be a device that regulates, directs, or controls the flow of a fluid, gas, liquid, etc. by opening, closing, or obstructing various passageways. Valve 110 may be utilized in high-horsepower pumps, wherein grooveless fluid end may operate in a harsh pumping environment, such as shale fracturing operations.

Spring 115 may be coupled with valve 110 and a lower surface of spring retainer 140. Spring 115 may be configured to extend and contract to allow valve 110 to open and close. Responsive to spring 115 extending and contracting, spring 115 may apply force against spring retainer 140.

Suction bore 120 may be a portion of a grooveless fluid end configured to house valve 110, spring 115, and spring retainer 140. Suction bore 120 may have a hollow interior that is configured to allow spring retainer 140 to move vertically within a circumference of suction bore 120 via spring 115. A proximal end of suction bore 120 may include ridges 130.

Ridges 130 may be projections that decrease the circumference of suction bore 120, wherein ridges 130 are positioned at an upper surface of suction bore 120. In embodiments, ridges 130 may be formed by tapering or angling the sidewalls of suction bore 120. Thus, a body of suction bore 120 may have a first circumference, and the portion of suction bore 120 including ridge 130 may have a second circumferences.

In embodiments, a top surface of spring retainer 140 may be configured to be positioned adjacent to a lower surface of ridges 130. Responsive to spring 115 applying force to spring retainer 140, spring retainer 140 may apply force against ridges 130. However, because the circumference of ridges 130 may be smaller than the circumference of spring retainer 140 and the upward force applied against spring retainer 140 by spring 115, spring retainer 140 may be secured in place against ridges 130.

Spring retainer 140 may be a device that is configured to stop the fluid flow within system 100. In embodiments, a lower surface of spring retainer 140 may be configured to receive force from spring 115, wherein the force received from spring 115 may push an upper surface of spring retainer 140 against ridges 130. When spring 115 pushes spring retainer 140 against ridges 130, spring retainer 140 may have an upper surface that is below an upper surface of ridges 130. The sides of spring retainer 140 may be angled to correspond with the tapering of ridges 130. Accordingly, spring retainer 140 may be shaped and/or sized corresponding to the slope of ridges 130. Spring retainer 140 may have a length that is greater than the diameter between ridges 130 but less than a diameter of suction bore 120. Therefore, spring retainer 140 may completely cover the lower surfaces of ridges 130, wherein a lower surface of ridges 130 may not be exposed. Accordingly, spring retainer 140 may be held in place within suction bore 120 via ridges 130 without grooves being disposed within suction bore.

Stem 150 may be a stem that projects away from a top surface of spring retainer 140. Stem 150 may project away from spring retainer 140 in a direction that is perpendicular to spring retainer 140. In embodiments, stem 150 may be positioned proximate to but not on an end of spring retainer 140. More specifically, when spring retainer 140 is positioned adjacent to a lower surface of ridges 130, stem 150 may be positioned adjacent to a sidewall of a ridge 130. Stem 150 may include a hollow bore extending from a first side of stem 150 to a second side of stem 150, wherein the hollow bore is configured to receive a portion of keeper 160.

Keeper 160 may be a stabilizing and alignment device that is configured to be removably coupled to stem 150, and be positioned adjacent to cylinder head 170. Keeper 160 may have rounded ends 166, wherein rounded ends 166 have a curvature that is substantially similar to the curvature of the bore which keeper 160 is within. Keeper 160 may also include a cylindrical projection 164, wherein cylindrical projection 164 extends in a direction perpendicular to a longitudinal axis of keeper 160. In embodiments, cylindrical projection 164 may be configured to be inserted in the hollow bore that extends through stem 150.

Responsive to coupling keeper 160 with stem 150, a sidewall of keeper 160 may be positioned in a direction parallel to stem 150. Due to the positioning of the sidewall of keeper 160, it may be verified that keeper 160 is inserted into stem before sealing the bore with cylinder head. Accordingly, when keeper 160 is coupled with stem 150, cylindrical projection 164 is parallel with but not coaxial to the bore keeper 160 is confined in. Thus, both keeper 160 and spring retainer 150 may be secured in place and may be unable to rotate. To this end, erosion to spring retainer 150 and suction bore 120 may be reduced, limited, prevented, etc. wherein cylindrical projection 164 does not have the same axis of rotation as cylinder head 170.

Cylinder head 170 may have an external surface that is configured to couple with rounded edges of a bore, and cylinder head 170 may have a flat external face. Responsive to positioning cylinder head 170 into the bore, the bore may be sealed. Furthermore, and the portion of the circumference of cylinder head 170 may be positioned vertically higher than an upper surface of spring retainer 140.

Figure 2:
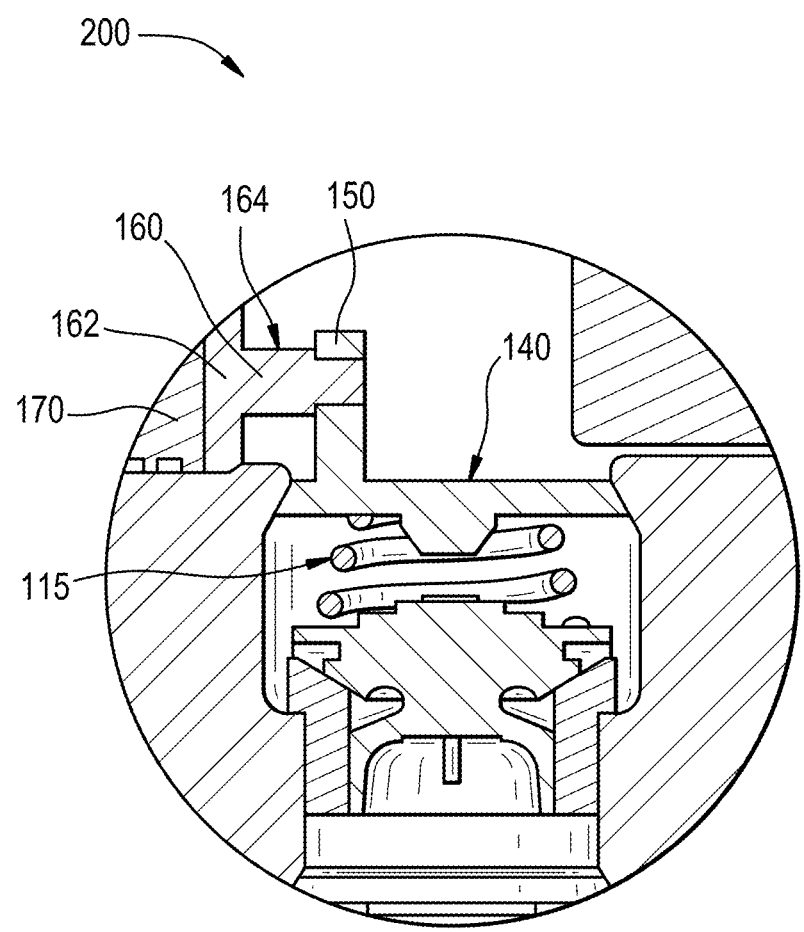
FIG. 2 depicts a cross section of the suction bore of a grooveless fluid end for high pressure pumping, according to an embodiment.

FIG. 2 depicts a cross section of a suction bore of a grooveless fluid end 200 for high pressure pumping, according to an embodiment. Elements depicted in FIG. 2 are described above. For the sake of brevity, an additional description of these elements is omitted.

As depicted in FIG. 2, keeper 160 may be configured to be inserted into cylinder head 170 and stem 150. Keeper 160 may have a first portion, projection 162, which is configured to extend perpendicularly away from a second portion 164 of keeper 160.

Projection 164 of keeper may include a first cylinder and a second cylinder, wherein the first cylinder includes a first diameter and the second cylinder includes a second diameter. The first cylinder may be configured to project away from the second portion 164 of keeper 160, and have a face with portions positioned adjacent to a first side of stem 150. The second cylinder may be configured to extend through a hole within stem 150, such that a second end of the second cylinder forms a continuous, planar surface with a second side of stem 150.

The second portion 162 of keeper 160 may include a planar sidewall that is disposed at a location that is outside of the inner sidewalls of suction bore 120 and the outer surfaces of spring retainer 140. The planar sidewall of keeper 160 may be configured to be positioned adjacent to a face of cylinder head 170.

Figure 3:
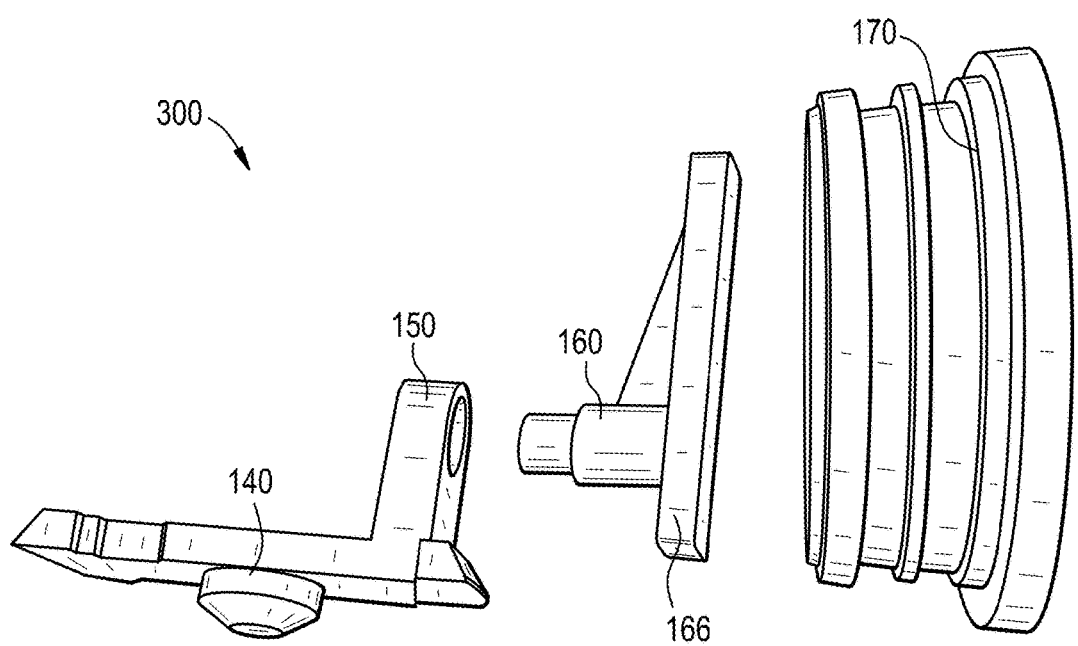
FIG. 3 depicts a spring retainer, keeper, and cylinder head that fit in a grooveless fluid end for high pressure pumping, according to an embodiment.

FIG. 3 depicts a spring retainer, keeper, and cylinder head that fit in a grooveless fluid end 300 for high pressure pumping, according to an embodiment. Elements depicted in FIG. 3 are described above. For the sake of brevity, an additional description of these elements is omitted.

As depicted in FIG. 3, spring retainer 140, keeper 160, and cylinder head 170 may all be independent parts, which can be separated from each other. As further depicted in FIG. 3, keeper 160 has ends with rounded edges 166. The curvature of rounded edges 166 may correspond to the curvature of a bore. In embodiments, keeper 160 may be configured to be positioned adjacent to a face of cylinder head 170.

Figure 4:
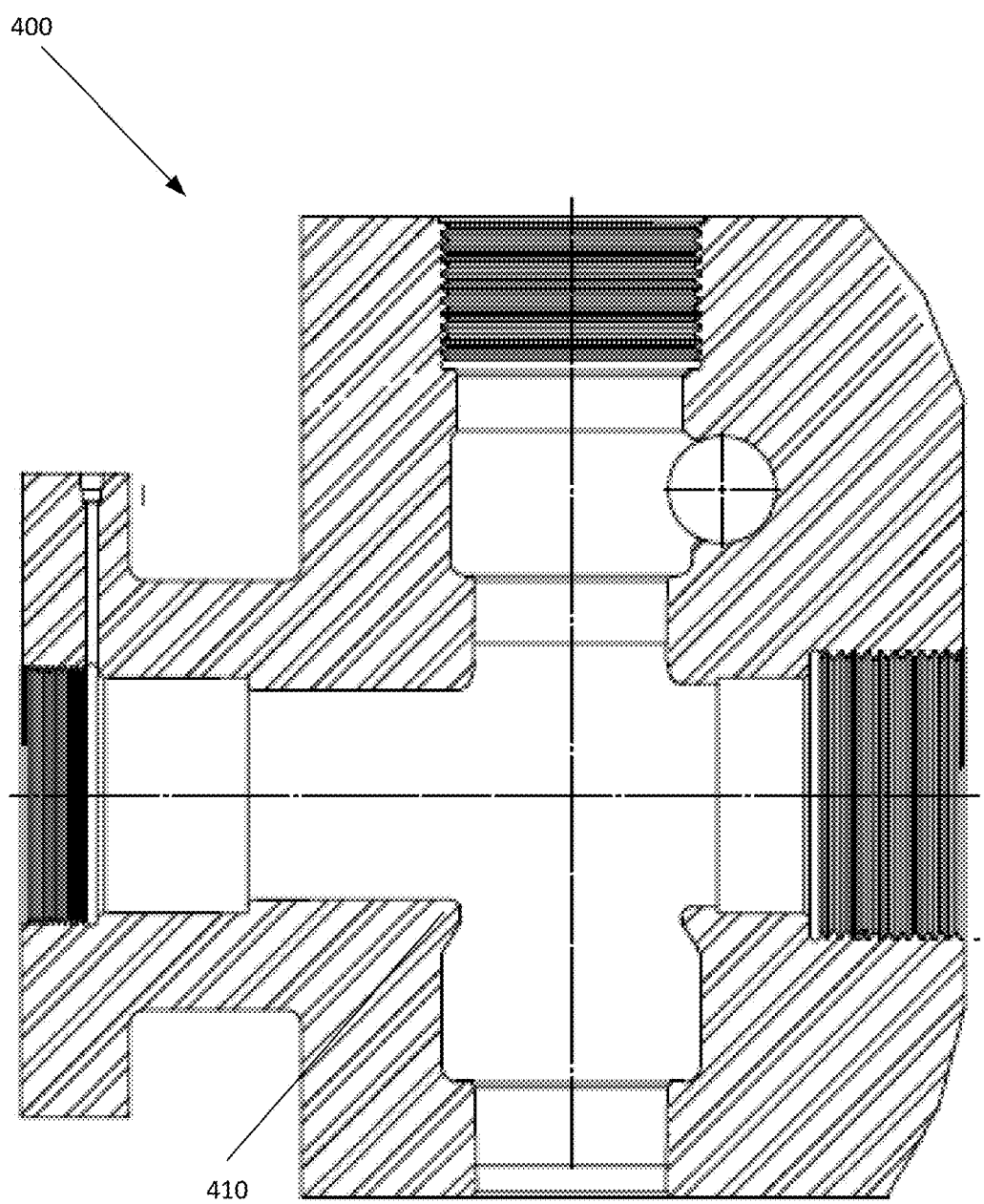
FIG. 4 depicts a cross section of a fluid end block, according to an embodiment.

FIG. 4 depicts one embodiment of a fluid end block 400. As depicted in FIG. 4, the ridges 410 are configured to allow a spring retainer to be positioned under ridges 410. Accordingly, ridges 410 allow the spring retainer to be coupled within fluid end block 400 without additional grooves, cutouts, channels in the intersecting bore area. Thus, fluid end block 400 may not include any additional cutouts, grooves, channels, etc.

Figure 5:
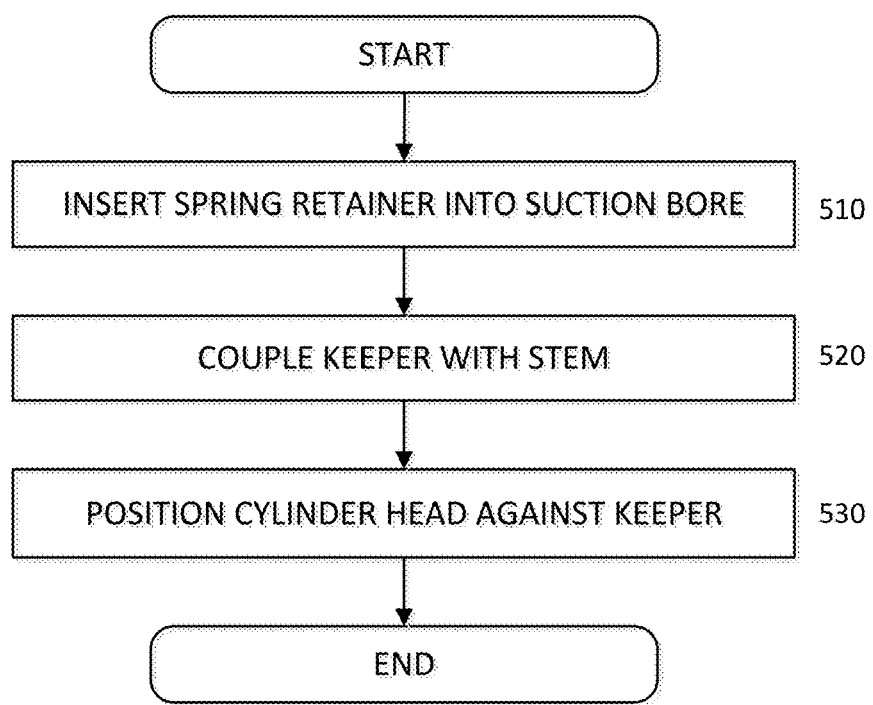
FIG. 5 depicts a method utilizing a grooveless fluid end for high pressure pumping, according to an embodiment.

FIG. 5 depicts an embodiment of a method 500 utilizing a grooveless fluid end for high pressure pumping. The operations of method 500 presented below are intended to be illustrative. In some embodiments, method 500 may be accomplished with one or more additional operations not described, and/or without one or more of the operations discussed. Additionally, the order in which the operations of method 500 are illustrated in FIG. 5 and described below is not intended to be limiting.

At operation 510, a spring retainer may be inserted below tapered ridges of a suction bore. The spring retainer may have tapered ends that correspond to the tapering of the ridges. The ridges may be positioned on an upper surface of the suction bore, wherein the circumference at the ridges is smaller than the circumference at the suction bore.

At operation 520, a projection of the keeper may be inserted into a stem of the spring retainer. Accordingly, the keeper may be inserted into a bore and coupled with the spring retainer before the bore is sealed by the At operation 530, a first side of a keeper may be positioned adjacent to a face of the cylinder head. When the projection of the keeper is inserted into the bore through the stem, it may be determined that the sidewall of the keeper is perpendicular to the upper surface of the spring retainer. Thus, when the cylinder head is inserted into the bore, the face of the cylinder head is in perpendicularly aligned with the spring retainer.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

The invention claimed is:

1. A system for a pressure pumping structure, the system comprising:
a spring retainer with a stem;
a keeper being configured to stabilize a cylinder head, the keeper including a body with a planar rear face positioned on a first face of the keeper and a projection positioned on a second face of the keeper, the planar rear face being configured to be positioned adjacent to the cylinder head, and the projection extending in a direction perpendicular to the body of the keeper is being configured to be inserted into the stem, wherein a first axis of rotation associated with the keeper is not coaxial with a second axis of rotation associated with the cylinder head, the keeper being positioned between the stem and the cylinder head, the first face of the keeper and the second face of the keeper being positions on opposite sides of each other.

2. The system of claim 1, wherein the projection includes a first portion having a first circumference, and a second portion having a second circumference.

3. The system of claim 1, wherein the projection is positioned more proximate to a base of the keeper than a top surface of the keeper.

4. The system of claim 1, wherein the planar rear face of the keeper is continuous from a lower surface of the keeper to an upper surface of the keeper.

5. The system of claim 1, wherein the keeper includes a front face, wherein a portion of the front face is configured to be positioned adjacent to a sidewall of a ridge of a suction bore.

6. The system of claim 1, wherein the cylinder head and the keeper are independent and separable elements.

7. The system of claim 1,
wherein, the spring retainer is configured to be inserted into a suction bore, the spring retainer including the stem projecting away from an upper surface of the spring retainer in a direction that is perpendicular to the first axis of rotation and the second axis of rotation.

8. The system of claim 7, wherein the projection is configured to be inserted into a hollow channel extending through the stem.

9. The system of claim 7, wherein the projection includes a first portion and a second portion, the first portion having a smaller circumference than the second portion.

10. The system of claim 9, wherein the first portion is configured to be inserted within the hollow channel, and a face of the second portion is configured to be positioned adjacent to the stem.

11. The system of claim 7, wherein the stem includes a planar front face and a planar rear face.

12. A method for a high pressure pumping system, the method including the steps of:
positioning a planar rear face of a keeper adjacent to a cylinder head, the planer rear face of the keeper being positioned on a first face of the keeper, wherein the cylinder head and the keeper are independent and separable elements, the first face of the keeper and the second face of the keeper being positions on opposite sides of each other;
inserting a projection on the keeper within a hollow channel into a stem of a spring retainer, the projection extending in a direction perpendicular to a body of the keeper and being positioned on a second face of the keeper, wherein a first axis of rotation associated with the keeper is not coaxial with a second axis of rotation associated with the cylinder head;
positioning the keeper between the stem and the cylinder head.

13. The method of claim 12, further comprising:
inserting the spring retainer into a suction bore, the stem projecting away from an upper surface of the spring retainer in a direction that is perpendicular to the first axis of rotation and the second axis of rotation.

14. The method of claim 13, wherein the projection includes a first portion and a second portion, the first portion having a smaller circumference than the second portion.

15. The method of claim 14, wherein the first portion is configured to be inserted within the hollow channel, and a face of the second first portion is configured to be positioned adjacent to the stem.

16. The method of claim 13 wherein the stem includes a planar front face and a planar rear face.

17. The method of claim 12, wherein the planar rear face of the keeper is continuous from a lower surface of the keeper to an upper surface of the keeper.

18. The method of claim 12, further comprising:
positioning a portion of a front face of the keeper adjacent to a sidewall of a ridge of a suction bore.

* * * * *